United States Patent
Taylor

(10) Patent No.: US 7,836,452 B2
(45) Date of Patent: Nov. 16, 2010

(54) SYSTEM, METHOD AND PROGRAM FOR ESTIMATING A REQUISITE AMOUNT OF SERVER RESOURCES

(75) Inventor: Rick A. Taylor, Placentia, CA (US)

(73) Assignee: International Business Machines Corporation, Armonk, NY (US)

( * ) Notice: Subject to any disclaimer, the term of this patent is extended or adjusted under 35 U.S.C. 154(b) by 1463 days.

(21) Appl. No.: 11/149,865

(22) Filed: Jun. 10, 2005

(65) Prior Publication Data

US 2006/0282825 A1    Dec. 14, 2006

(51) Int. Cl.
G06F 9/46     (2006.01)
G06F 15/173   (2006.01)

(52) U.S. Cl. .................. 718/104; 718/105; 709/226; 709/2; 709/44

(58) Field of Classification Search ............. None
See application file for complete search history.

(56) References Cited

U.S. PATENT DOCUMENTS

| | | | | |
|---|---|---|---|---|
| 6,757,689 | B2 | 6/2004 | Battas et al. | 707/101 |
| 7,020,697 | B1 * | 3/2006 | Goodman et al. | 709/223 |
| 2003/0217153 | A1 | 11/2003 | Rao et al. | 709/226 |
| 2004/0028070 | A1 | 2/2004 | Barr et al. | 370/431 |
| 2004/0034577 | A1 * | 2/2004 | Van Hoose et al. | 705/28 |
| 2004/0049579 | A1 | 3/2004 | Ims et al. | 709/225 |
| 2004/0111725 | A1 * | 6/2004 | Srinivasan et al. | 718/105 |
| 2004/0267897 | A1 * | 12/2004 | Hill et al. | 709/217 |
| 2006/0010176 | A1 * | 1/2006 | Armington | 707/204 |
| 2006/0095309 | A1 * | 5/2006 | Mangan et al. | 705/8 |
| 2006/0179171 | A1 * | 8/2006 | Stefaniak et al. | 710/15 |
| 2006/0242282 | A1 * | 10/2006 | Mullarkey | 709/223 |
| 2006/0282825 | A1 * | 12/2006 | Taylor | 717/127 |
| 2007/0180083 | A1 * | 8/2007 | Adam et al. | 709/223 |

(Continued)

OTHER PUBLICATIONS

Urgaonkar et al., "Resource Overbooking and Application Profiling in Shared Hosting Platforms", 2002, ACM, pp. 1-15.*

(Continued)

Primary Examiner—Tuan Q Dam
Assistant Examiner—Ben C Wang
(74) Attorney, Agent, or Firm—Arthur J. Samodovitz

(57) ABSTRACT

System, method and program product for determining if a plurality of applications executed on a plurality of servers can be executed on a single server. First program instructions determine if the single server has sufficient processor power to execute the plurality of applications. Second program instructions determine if the plurality of applications have a same type of operating system on the plurality of servers. Third program instructions determine if the plurality of applications have a same type of middleware on the plurality of servers. The first program instructions determine peak processor utilizations and times of the peak processor utilizations for the plurality of applications, respectively, to determine whether the single server has sufficient processor power to execute the plurality of applications. Other program instructions determine the single server to be a standard vendor server which has a smallest processor adequate to support processing requirements of the plurality of applications and has a predetermined, minimum processing power in reserve. Other program instructions determine if the plurality of applications have a similar function or are identical. Other program instructions determine if the plurality of applications have a same type of application environment on the plurality of servers.

16 Claims, 7 Drawing Sheets

U.S. PATENT DOCUMENTS

2008/0282267 A1* 11/2008 Adam et al. ................ 719/320

OTHER PUBLICATIONS

Stewart et al., "Profile-Driven Component Placement for Cluster-Based Online Services", Oct. 2004, IEEE, vol. 5, No. 10, pp. 1-13.*
INSPEC: Outsourcing Service Rendering System—AN 7856555; Arima, H. 2003.
Globally Distributed Content Delivery—AN 7406544; Dilley, J. et al; 2002.
ACM Digital Library: Managing Energy & Server Resources in Hostinng Centers—Chase, JS. et al 2001.
Sizing DB2 UDB Servers for Business Intelligence Workloads—Wasserman, TJ et al 2004.
A Cost-Oriented Approach for Infrastructural Design—Ardagna, D. et al 2004.

* cited by examiner

SYSTEM, METHOD AND PROGRAM FOR ESTIMATING A REQUISITE AMOUNT OF SERVER RESOURCES

FIELD OF THE INVENTION

The present invention relates generally to computer systems. The present invention relates more specifically to a technique to estimate an amount of server resources in an "on demand" or "utility" server model required to satisfy needs of a customer.

BACKGROUND OF THE INVENTION

An "on demand" or "utility" server model is currently known. In this model, a customer does not own, possess or maintain servers, such as computer hardware, operating system and certain middleware (when part of a predefined "on demand" solution), which execute the customer's applications. Rather, a vendor owns, possesses and maintains the servers which execute the customer's applications. Typically, the vendor offers one or more standard server solutions for all customers. The vendor's servers may be dedicated to one customer or shared by multiple customers using one of many known virtualization techniques. Known virtualization techniques include VMWare (tm of VMWare Inc.), virtualization on IBM xSeries or IBM Blade Center servers (based on Microsoft Windows operating systems) and AIX operating system's logical partitioning capabilities on IBM's pSeries servers. The sharing of servers reduces cost when a single customer does not have enough workload to occupy a full server or when different customers have different times of peak utilization. Each server has standardized hardware (including processors, memory, storage, etc.), standardized platform software (including operating systems, management software, middleware), and applications for use by the customer(s).

There are customer-specific applications such as airline reservation software, banking software, etc., and general purpose applications such as database applications. The customer is typically responsible for maintaining its own application(s). Each customer accesses its own applications from the vendor's servers via a network such as a virtual private network, point to point network, ISDN, frame relay network or the World Wide Web. The vendor measures or meters each customer's use of the vendor's server resources and charges each customer based on the customer's use such as the amount (number of gigabytes) of assigned disk storage and the number of CPU Hours that the customer utilizes during the month. The vendor also charges the customer for "fixed costs" such as the number of dedicated servers or logical partitions on which the customer's application(s) execute.

Before a new customer is added to "on demand" or "utility" environment, typically an operator estimates how much server hardware and software the customer will need steady state and peak, the peak demand times, and how much and what type of server resources, if any, need to be added to the pool to satisfy the new customer. Typically the customer currently owns its own servers, and the vendor considers the capacity of the customer's current servers and their percent of utilization to estimate the customer's current server needs. If the new customer requires dedicated servers, then the vendor will commission these, and install and execute the customer applications on these new servers. If the new customer can share an existing vendor server, then the new customer's application can be installed and executed in a shared mode, typically on separate LPAR(s), on the existing vendor server.

It was also known that in some cases where the customer is currently using two or more of its own servers, these can be consolidated into one dedicated server in an "on demand" or "utility" model. For example, if the customer was only using a small percentage of the capacity of its current servers, these may be consolidated into one vendor server of similar or equal power in an "on demand" or "utility" model. The cost savings result from a reduction in (a) number of operating systems, (b) virtual memory, (c) real memory, (d) swap disk space, (e) system management software licenses, (f) customer application software licenses, (g) systems administration and support, (h) floor space, and/or (i) electricity and cooling costs.

An object of the present invention is to provide a technique to estimate the server resources required by a new or existing customer in an "on demand" or "utility" delivery and billing solution.

Another object of the present invention is to provide a technique to estimate cost effective server resources required by a new or existing customer in an "on demand" or "utility" delivery and billing solution.

SUMMARY

The present invention resides in a system, method and program product for determining if a plurality of applications executed on a plurality of servers can be executed on a single server. First program instructions determine if the single server has sufficient processor power to execute the plurality of applications. Second program instructions determine if the plurality of applications have a same type of operating system on the plurality of servers. Third program instructions determine if the plurality of applications have a same type of middleware on the plurality of servers.

According to a feature of the present invention, the first program instructions determine peak processor utilizations and times of the peak processor utilizations for the plurality of applications, respectively, to determine whether the single server has sufficient processor power to execute the plurality of applications.

According to another feature of the present invention, other program instructions determine if the plurality of applications have a similar function or are identical.

According to another feature of the present invention, other program instructions determine if the plurality of applications have a same type of application environment on the plurality of servers.

According to another feature of the present invention, other program instructions determine if the plurality of applications are compatible.

According to another feature of the present invention, other program instructions determine the single server to be a standard vendor server which has a smallest processor adequate to support processing requirements of the plurality of applications and has a predetermined, minimum processing power in reserve.

DETAILED DESCRIPTION OF THE PREFERRED EMBODIMENTS

Figure 1:
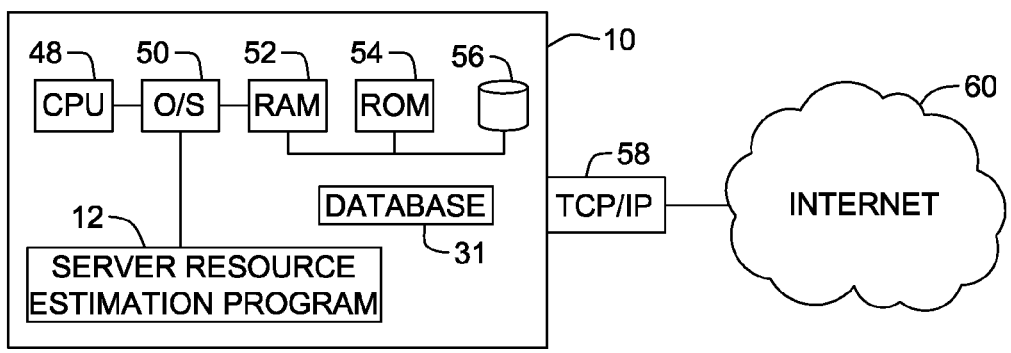
FIG. 1 is a block diagram of a server which includes a server resource estimation program, according to the present invention, to estimate an amount and type of server resources required in an "on demand" or "utility" environment to satisfy needs of a new customer.
Figure 2:
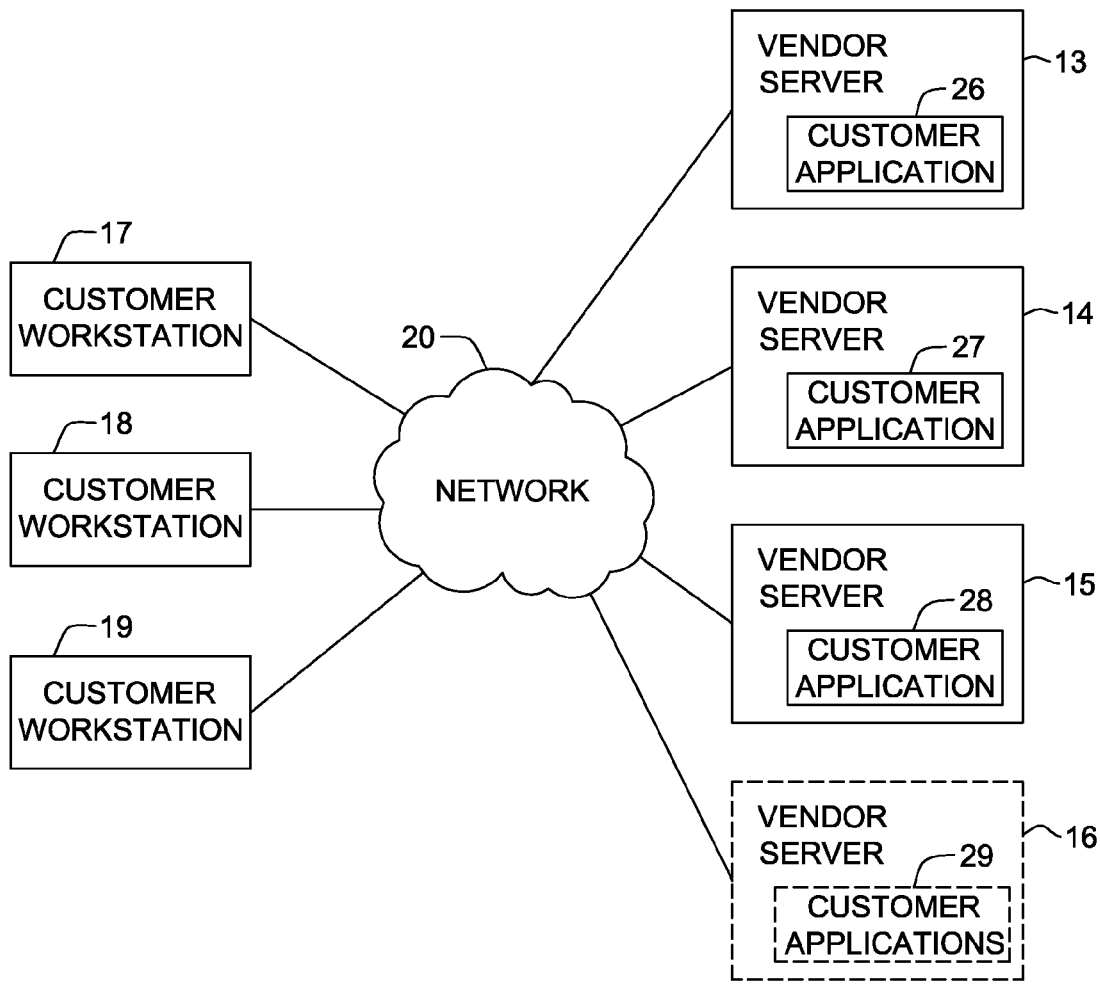
FIG. 2 is a block diagram of an "on demand" or "utility" environment.

The present invention will now be described in detail with reference to the Figures. FIG. 1 illustrates a computer 10 which includes a server resource estimation program 12 to estimate amount and type of server resources (processor power, memory and storage) required in an "on demand" or "utility" environment to satisfy needs of a new customer. From the estimation of the required amount of server resources, program 12 determines a type of server to best provide these server resources. The type of server is based on the amount of "on demand" processor power required to perform the work currently being done on the customers current server(s). The "on demand" servers may be real or virtualized. The virtualized servers can be server(s) that are divided into logical partitions where each logical partition or groups of logical partitions may each be dedicated to separate customers and their applications. Alternately, the "on demand" servers may be dedicated to separate customers and their applications. Typically, the "on demand" server provider/vendor offers certain predefined platforms such as Unix or Intel based platforms, some of which provide secure logical partitioning. Computer 10 also includes a CPU 48, an operating system 50, RAM 52, ROM 54, storage 56, and TCP/IP adapter card 58 to communicate with Internet 60.

As explained in more detail below, an operator supplies to program 12 (a) descriptive information about the customer's current (privately owned, possessed and maintained) server hardware, operating system, management software and applications (not shown) such as commercial business applications such as airline reservation software, (b) quantitative information about the customer's current amount of utilization of each server such as number of processor utilization hours per day, peak utilization periods, and number of days per week with peak utilization, and (c) details about specific middleware including DB2, Websphere Application Server and Websphere MQ, such as number of DB2 database instances running on the server. By way of example, the customer's current servers can be UNIX servers or Intel-processor servers with Microsoft Windows operating systems. Program 12 also has a database 31 describing the standard types of servers 13, 14 and 15 currently maintained by a vendor in an "on demand" or "utility" model for existing and new customers. By way of example, servers 13, 14 and 15 can be IBM pSeries servers, IBM xSeries, or IBM BladeCenter servers. If desired, any or all of servers 13, 14 and 15 can be logically divided into logical partitions ("LPARs") in a known manner. Each LPAR is a logical division of processor and memory resources of a server. The logical division of the processor is implemented by time slicing the processor, and the logical division of the memory is implemented by dividing the allocation of the server's memory to each partition. In this "on demand" or "utility" model, customer workstations 17, 18, 19 are coupled to servers 13, 14 and 15 via a network 20 such as VPN, frame relay, ISDN, Point to Point, or World Wide Web/Internet to access the customers' applications 26, 27, 28 which execute on servers 13, 14 and 15, respectively. Program 12 also has a database describing the current utilization by the existing customers of the servers 13, 14 or 15, in case a single server can be shared by more than one customer. Program 12 normalizes the relative performance of the new customer's heterogeneous servers, and calculates the new customer's forecasted monthly utilization based on prime and off-prime shift utilization percentages provided by the customer. Based in part on this information, program 12 determines the number of hours of utilization required from a new server 16 or shared from existing servers 13, 14 or 15 in the "on demand" or "utility" model to perform the new customer's defined workload. If new server 16 is needed (for a new customer application 29), program 12 also determines the size and type of server 16 to best support the new customer's application 29, and the memory and storage required by the new customer. The new server 16, if needed, has an operating system 21, middleware 22 and customer application 24. The new customer is represented by workstation 23, and can access new server 16 via network 20.

Figure 3:
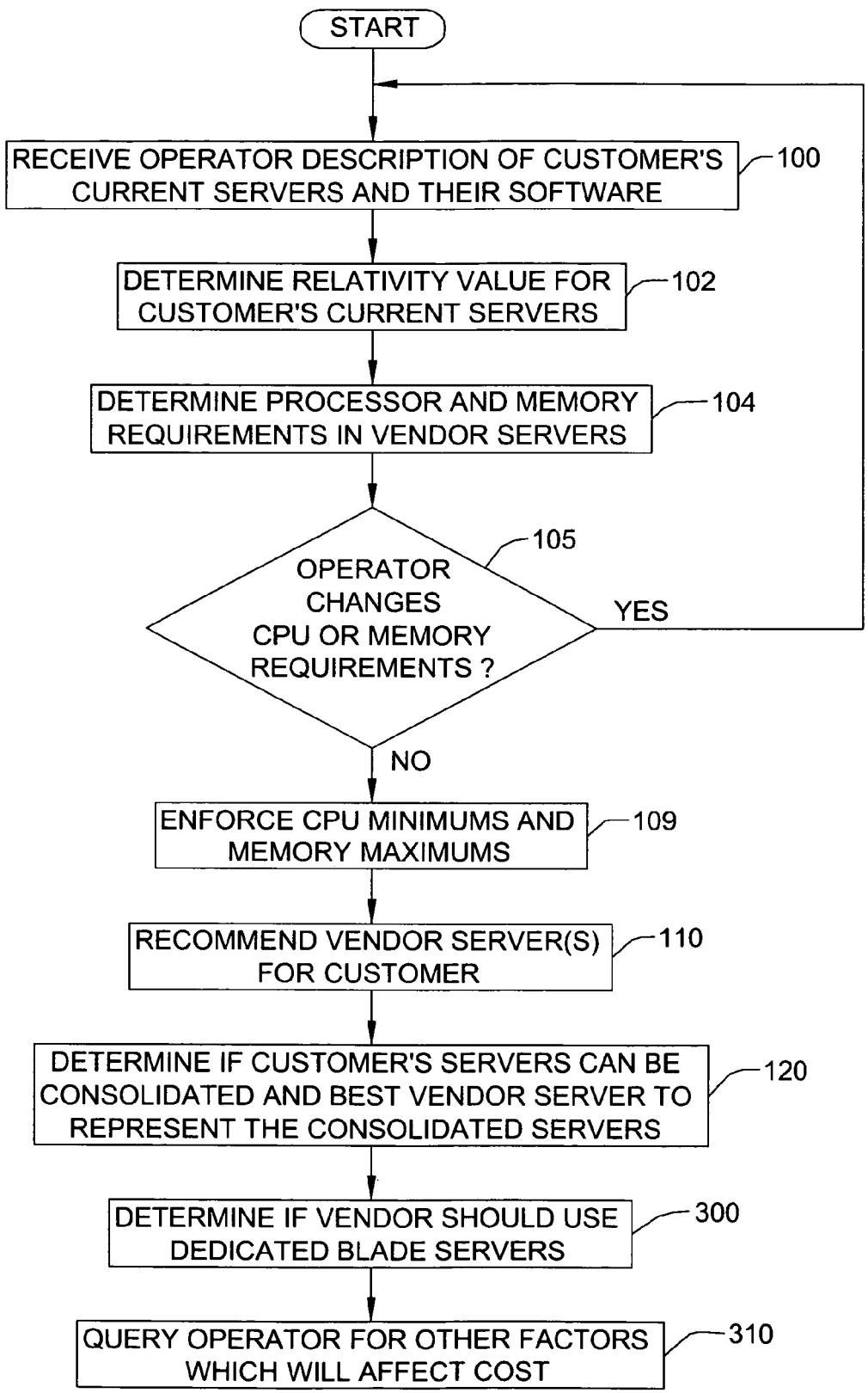
FIG. 3 is a flow chart of the server resource estimation program of FIG. 1.
Figure 4A:
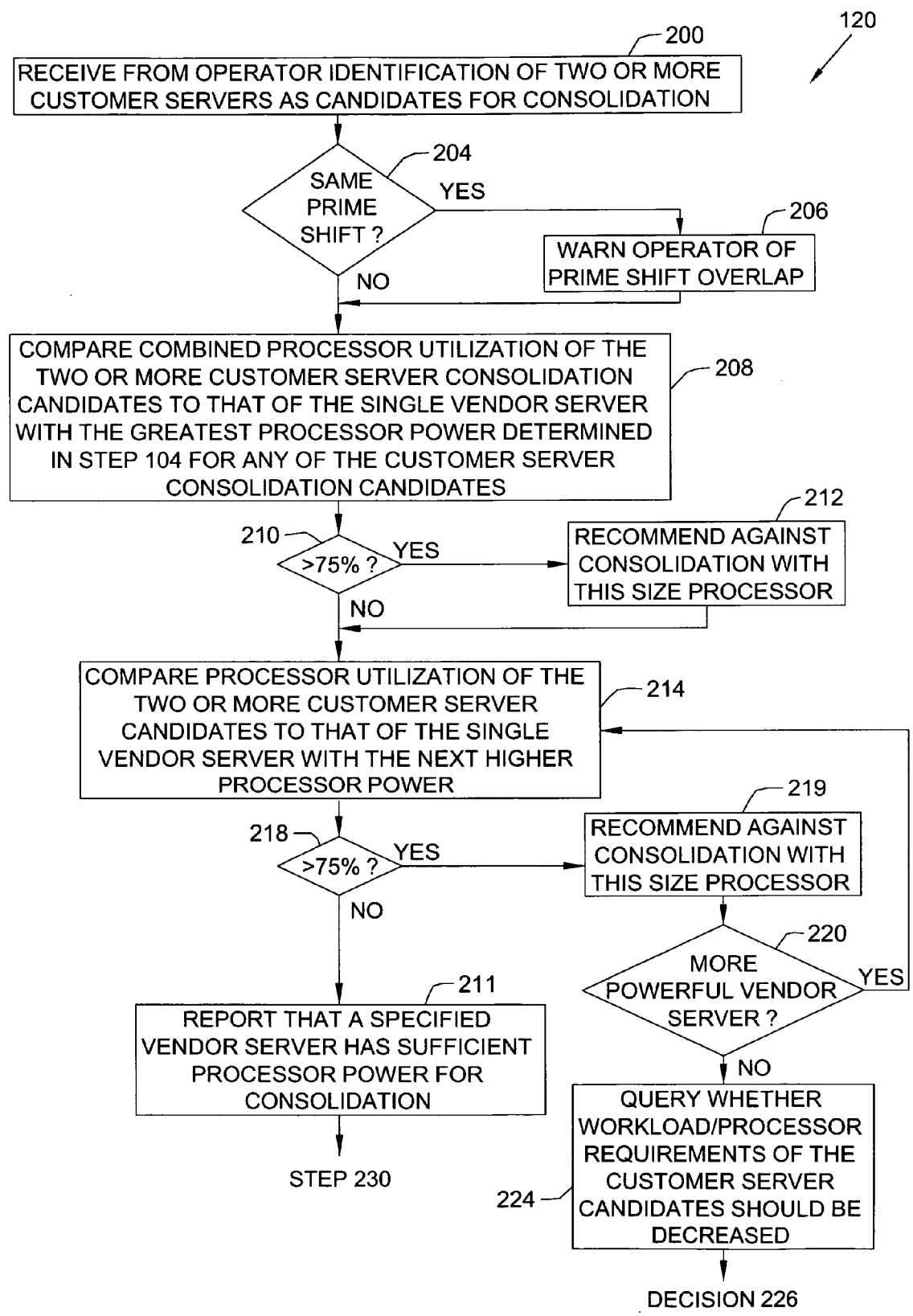
FIGS. 4(A-E) form a flow chart of a server consolidation determination function within the server resource estimation program of FIG. 3.
Figure 4B:
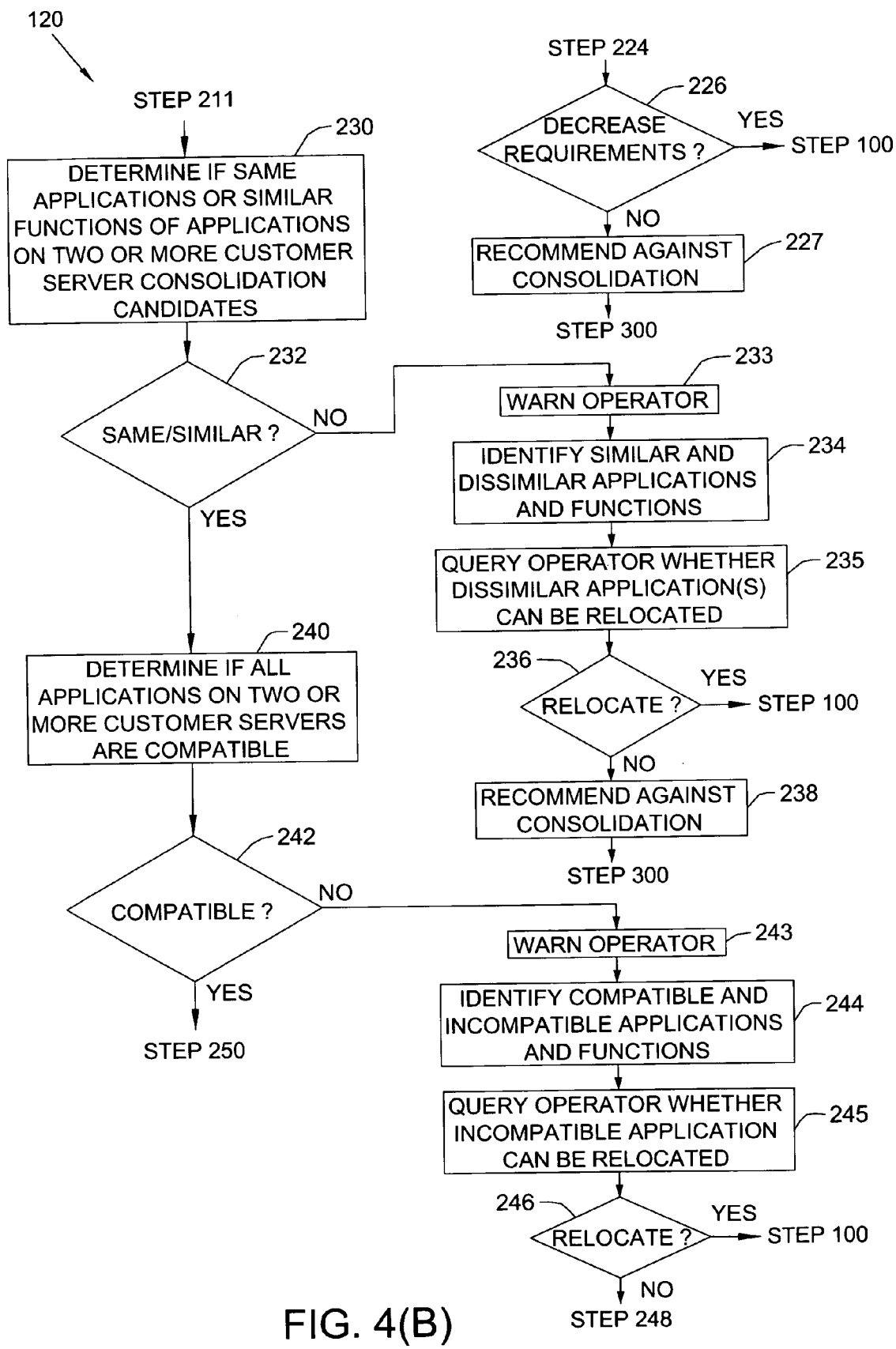
Figure 4C:
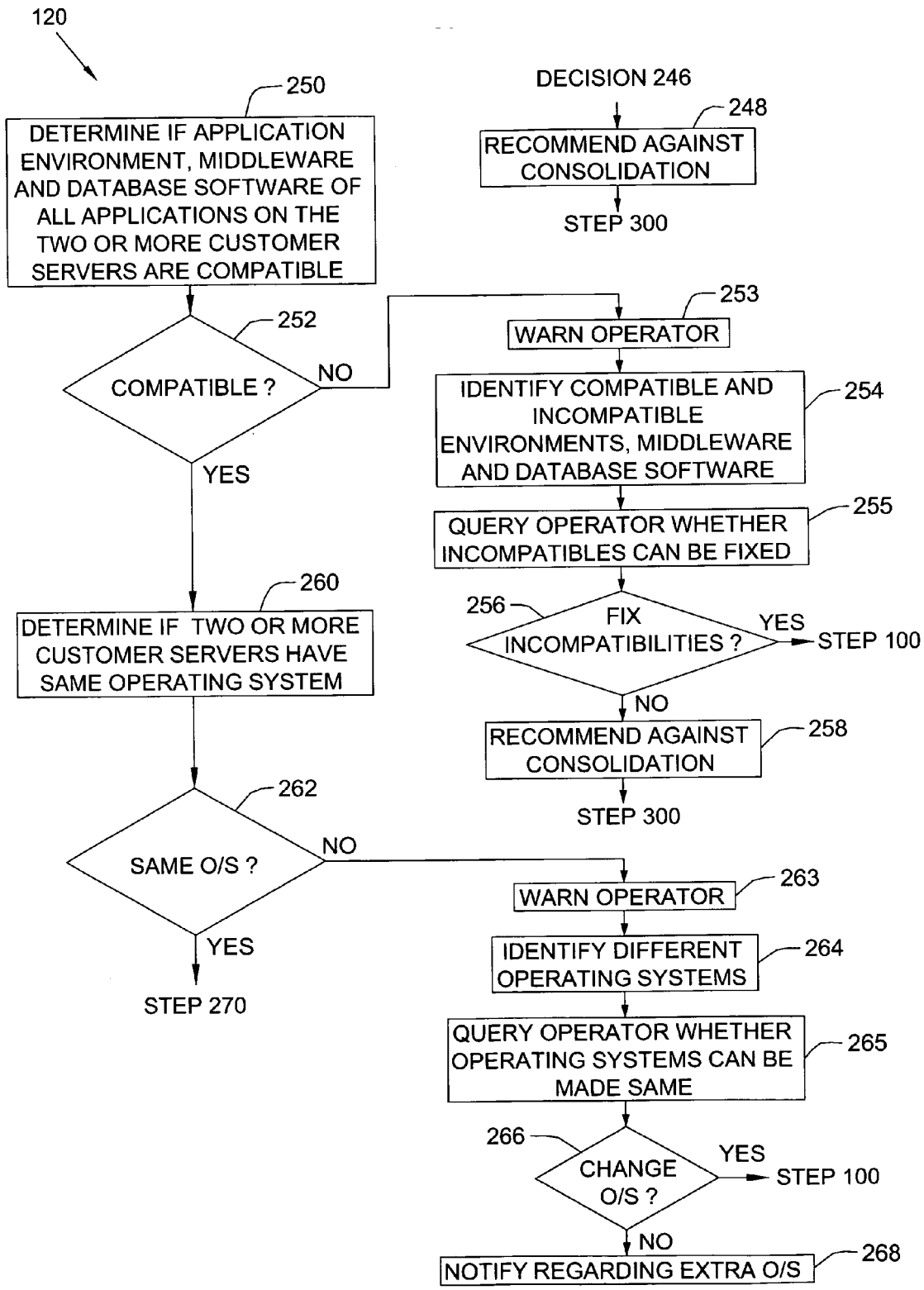
Figure 4D:
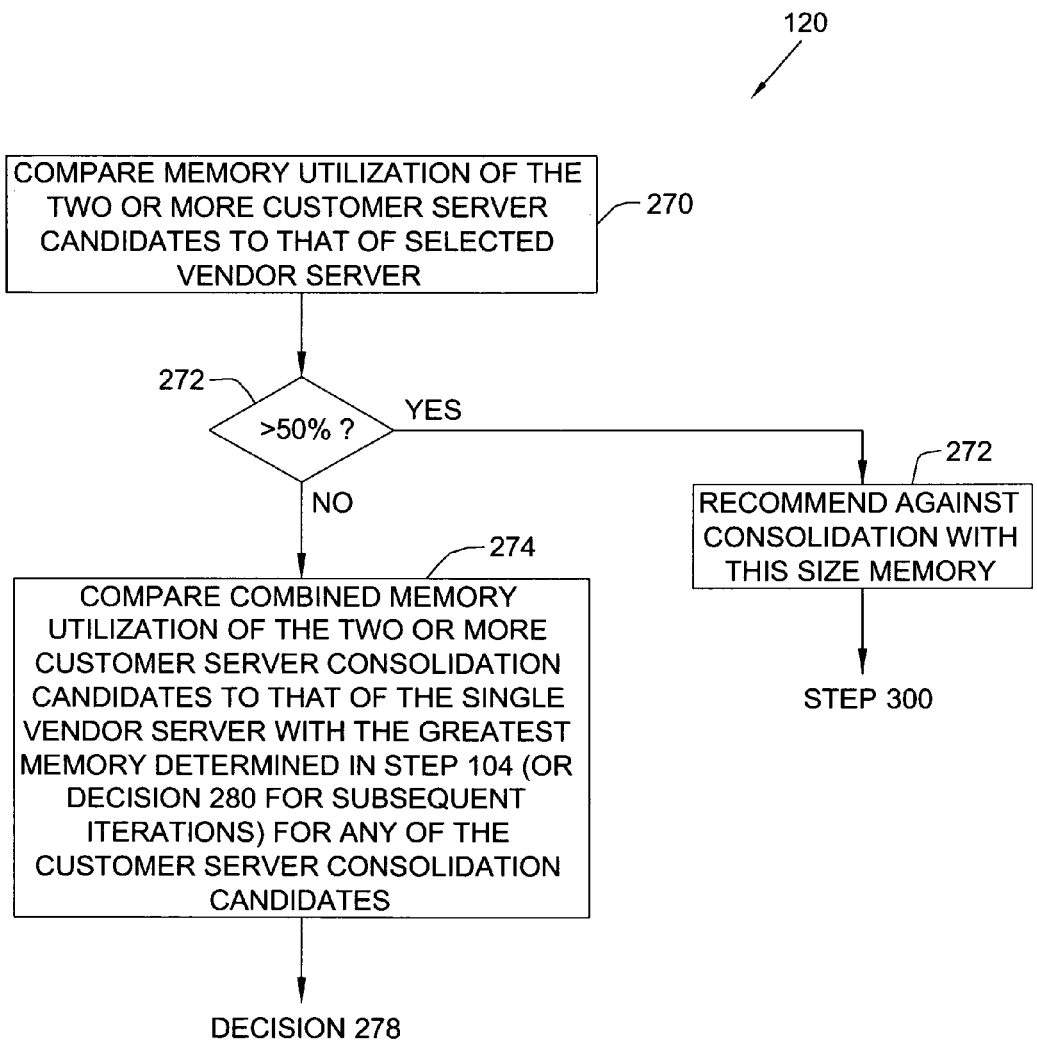
Figure 4E:
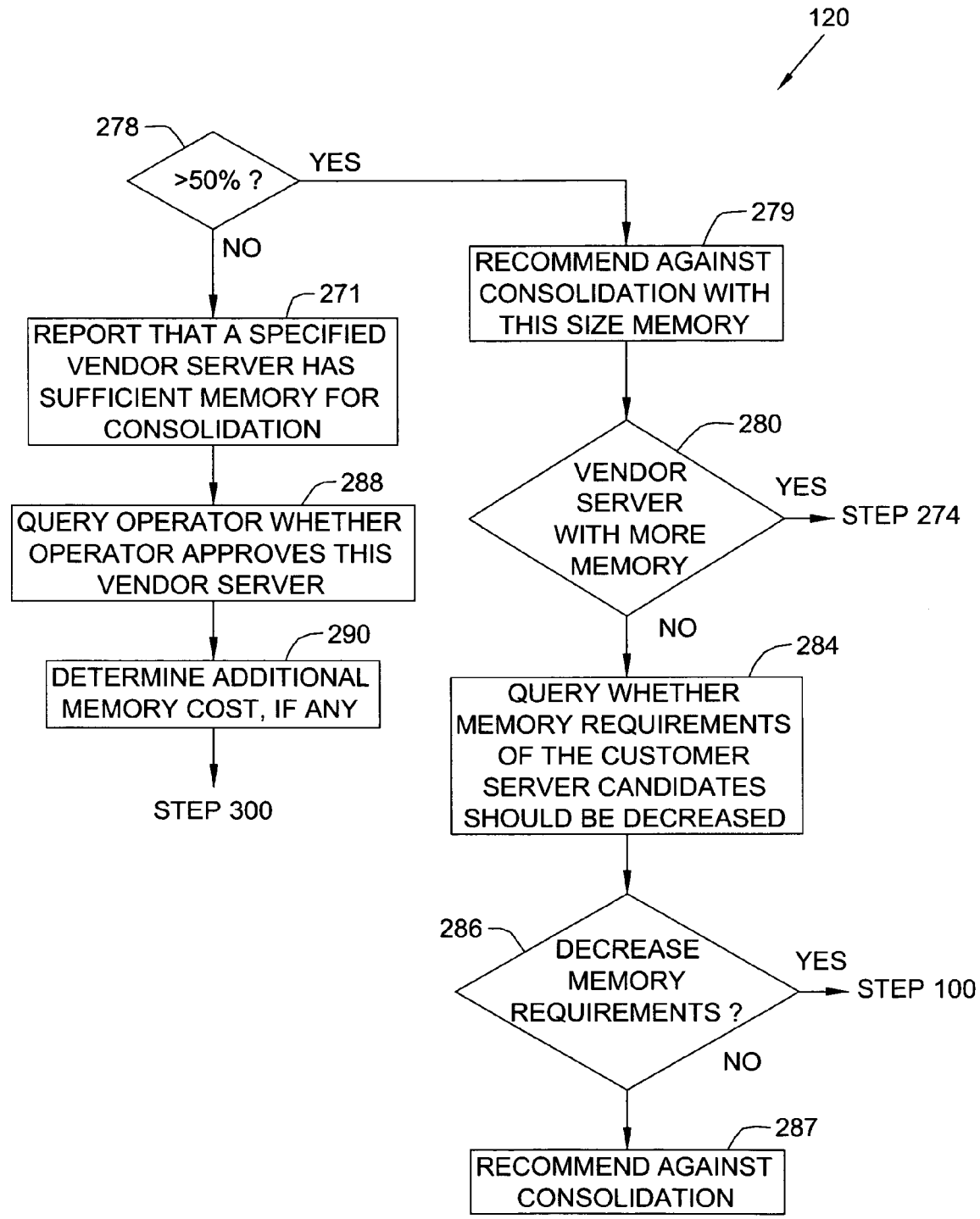

FIG. 3 illustrates the processing of program 12 in more detail for a new customer which has requested and is planned to use additional vendor server 16 (which is the same type as server 13, 14 or 15) or possibly share one of the servers 13, 14 and 15 with another customer. In this example, the new customer is switching from its privately owned, possessed and maintained server(s) to the vendor's server(s) in an "on demand" or "utility" model. In step 100, an operator enters the following information about the customer's current (privately owned, possessed and maintained) server(s) and application(s) for each current logical partition or real server owned by the customer:

(a) Information describing the customer's current (privately owned, possessed and maintained) servers, such as server vendor, model, operating system and version, number of processors, processor speed, amount of physical memory, operational status of server, server name or other unique identifier, application or other function of the customer's current server.

The following is an example of specific information parameters entered by an operator into program 12 for step 104:

Ideas=the "relativity value" or relative performance value of each customer owned server, for example, as determined by Ideas International.

EE=Execution Environment, a value of "1" for each customer owned LPAR or server that will be replaced one-for-one by a vendor LPAR or server, or=a value of "0" for each customer owned LPAR or server that will be consolidated with another customer owned LPAR or server into a single vendor owned LPAR or server, where the value "EE" for this other customer owned LPAR or server will be "1". An "Execution Environment" comprises the computer hardware and operating system software architecture of a server or LPAR.

Ram=amount of real memory actually installed on each customer owned server.

RamOD=amount of real memory required in the "on demand" server.

VramOD=amount of real memory required in the "on demand" VMWare servers.

PrimHrs=number of prime shift (peak utilization) hours on each customer owned server.

OffPrimHrs=number of non-prime shift hours on each customer owned server.

PrimUtl=monthly average prime shift utilization percentage on each customer owned server.

OffPrimUtl=monthly average non-prime shift hours on each customer owned server.

Hrs=Hours of utilization per month of each customer owned server.

CpuHrs="on demand" server CPU Hour baseline without minimum usage enforced.

Cpus=Amount of "on demand" CPUs required without minimum usage enforced.

HaType=denotes type of high availability cluster configuration required.

HaLpar=Amount of HA LPARs required.

HaNodes=Amount of nodes in the high availability cluster.

Db2=Number of IBM DB2 database (or equivalent) software instances on each customer owned server.

Was=Number of IBM Websphere Application Server (or equivalent) instances on each customer owned server.

Mq=Number of Websphere MQ (or equivalent) queues running on each customer owned server.

Vm=Selection to deliver on VMWare (or equivalent) lpar.

4way=Selection to deliver on 4-way xSeries server, (i.e. four processor server).

8way=Selection to deliver on 8-way xSeries server (i.e. eight processor server).

16way=Selection to deliver on 16-way xSeries server (i.e. sixteen processor server).

CpuM=Amount of "on demand" CPUs required with minimum usage enforced.

VmHrsM=CPU hour total for all on demand VMWare lpars with minimum usage enforced.

4wayHrsM=CPU hour total for all 4way demand lpars with minimum usage enforced.

8wayHrsM=CPU hour total for all 8way demand lpars with minimum usage enforced.

16wayHrsM=CPU hour total for all 16way demand lpars with minimum usage enforced.

(b) Information describing future server requirements of the customer, such as amount of physical memory that the customer will require and type of operating system to be used.

(c) Indication whether this customer server and another customer server are currently executing the same application, and can be consolidated into one server provided by the vendor.

(d) Information describing amount of utilization of customer's current server such as the customer's prime shift utilization hours and days, and number of prime (or "peak") utilization hours of the day (parameter "A" referenced below), number of off-prime hours of the day (parameter "OffPrimUtl" defined above in parameter list), and utilization percentages for both prime and off-prime hours.

(e) Information describing amount of customer's current disk storage allocation, the server's function or the server's primary application(s).

(f) Information indicating number of instances of IBM DB2 (or other vendor-preferred) database software that the customer wants on each server. This number can be zero (if the customer wants to use some other database application or no database application) or an integer greater than zero (if the customer wants to use the vendor-preferred DB2 database defined option rate).

(g) Information describing the customer's high availability cluster requirements. The requirements include whether the cluster is for Unix server meaning it will require HACMP high availability clustering software or whether it is for a Windows Inter server meaning high availability clustering will be supported by the "on demand" supported version of the Windows operating system without any additional software. Other required information is the number of nodes (servers or LPARs) to be included in the high availability cluster. Supported high availability cluster configurations are 2node, 3node and 4nodes. The type of high availability cluster is required means whether all nodes in the cluster are doing independent work (the user enters this as an "aa" or active-active high availability cluster configuration. If one server is doing independent work (called the active server) and the other is typically idle (called the passive server) waiting to perform the work of the active, then the user enters this as an "ap" or active-passive high availability cluster configuration.

(h) Information indicating number of instances of IBM Websphere Application Server software that the customer wants on each server. This number can be zero (if the customer wants to use some other middleware or no middleware) or an integer greater than zero (if the customer wants to use the vendor-preferred Websphere Application Server option rate).

(i) Information indicating number of instances of another type of IBM Websphere MQ software that the customer wants on each server. This number can be zero (if the customer wants to use some other middleware or no middleware) or an integer greater than zero (if the customer wants to use this vendor-preferred Websphere MQ option rate).

(j) Information describing optional support features required by the customer such as two levels of production control support (i.e. normal number of job abends and high percentage of job abends), whether third party software support is required, whether third party database software support is required, whether user ID support is required, and whether a developer's environment kit support is required.

(k) Information describing customer's peak (prime shift) hours of utilization and the days per week that have these peak (prime shift) hours.

Typically, the foregoing information (a-k) is based on actual information provided by the customer about the customer's current servers and some projections for vendor's "on demand" delivery requirements. However, if such data is not available, then the operator can estimate such data based on the customer's environment, operator's experience, other similar environments and other factors.

In step 102, program 12 looks-up (or the operator enters into program 12) a "relativity value" for a "performance" metric for each of the customer's current servers. The "relativity value" indicates a relative performance measurement of a common commercial server's processor power. By way of example, a company called Ideas International has analyzed different, common processors from Intel, for both Microsoft Windows, Linux (tm of Linus Torvalds) operating systems, IBM Unix servers, IBM iSeries servers, Dell servers, HP servers, Sun Microsystems servers, and Fujitsu servers, and provided their "relativity values". For example, the "relativity value" may indicate that the customer's current processor is 50% as powerful as the processor(s) in one of the vendor's standard servers. This performance metric coupled with the customer's actual amount of utilization of its servers indicates the processor needs of the customer in the "on demand" or "utility" model. However, typically, the vendor provides a server with at least 25% more processor power than currently required by the customer.

In step 104, program 12 performs the following calculations for each current customer server and current customer LPAR to determine the vendor server resources (i.e. processor and memory) required in the "on demand" or "utility" model:

The following equation calculates the number of hours for the month specified above based on prime shift utilization and off prime shift utilization (based on the customer's current utilization). Prime shift typically occurs five days per week (or twenty two days per month), six days per week (or twenty six days per month) or seven days per week (or 30.4 days per month). A full month has 730 total hours.

Total number of customer's current CPU Hours per month

Customers Utilized CPU Hours=((730−(22*PrimHrs))
*OffPrimUtl)+(22*PrimHrs*PrimUtl)

Program 12 calculates the actual number of CPU hours required in the on demand delivery center to match the customer's current utilization, based in part on the relativity values and utilization information. The "1586.4" value below is an example of the calibration metric used to normalize the constantly changing relativity values from the Ideas International report. The on demand cost modelers calibrate their cost rates to this same 1586.4 metric for the Unix servers. A slightly different metric is used for the Intel servers. This value is comparable to a normalization based on a mainframe MIP rating. Program 12 then multiplies the normalized relative performance value with the sum from the previous equation listed above, i.e. "Total number of customer's current CPU Hours per month". In this example, the product of this equation is called the "CPU Hour Baseline".

CPU Hour Baseline=(Ideas/1586.4)*Hrs

Program 12 uses the following algorithms/formulas for determining the various CPU Hour adder for 2node, 3node and 4node high availability cluster servers:

If HaType parameter has a value of either 'aa' (meaning active-active HA configuration) or 'ap' (meaning active-passive HA configuration) and the number of nodes in the HA cluster is more than "1" and less than "5", then program 12 will assign a value of "1" to the HaLpar parameter, i.e.

HaLpar=IF(OR(HaType="AP",HaType="AA"),IF
(AND(HaNodes>1,HaNodes<5),1,0),0)

If HaNodes has a value of "2" and HaType has a value of 'aa' or 'ap' then program 12 places a value of the CPU Hour Baseline value as the 2node HA CPU Hour baseline value. Otherwise the baseline value remains zero, i.e.

2node HA CPU Hour

Baseline=IF(OR(HaType="AP",HaType="AA"),IF
(HaNodes=2,CpuHrs,0),0)

If HaNodes has a value of "3" and HaType has a value of 'aa' or 'ap' then program 12 places a value of the CPU Hour Baseline value as the 3node HA CPU Hour baseline value. Otherwise the baseline value remains zero, i.e.

3node HACPU Hour

Baseline=IF(OR(HaType="AP",HaType="AA"),IF
(HaNodes=3,CpuHrs,0),0)

If HaNodes has a value of "4" and HaType has a value of 'aa' or 'ap' then program 12 places a value of the CPU Hour Baseline value as the 4node HA CPU Hour baseline value. Otherwise the baseline value remains zero, i.e.

4node HA CPU Hour

Baseline=IF(OR(HaType="AP",HaType="AA"),IF
(HaNodes=4,CpuHrs,0),0)

Specific "on demand" options are available such as IBM DB2, IBM Websphere Application Server, and IBM Websphere Queue Manager in this example. The baseline values for these options are determined using the same formula for CPU Hour Baseline, but with Db2 parameter input. An example of this formula for the DB2 option is as follows:

If the Db2 parameter has a value greater than 1, then program 12 assigns the CPU Hour Baseline value to the DB2 CPU Hour baseline. Otherwise, the DB2 CPU Hour baseline value remains zero, i.e.

DB2 CPU Hour Baseline=IF(OR(Db2=" ",
Db2=" ",Db2=0,0),0,CpuHrs)

The number of CPUs required for the "on demand" Unix server delivery is determined by the next example:

Program 12 then divides the prime shift utilization (PrimUtl in this example) by 0.7 which is the expected monthly average prime utilization of the "on demand" environment. This percentage includes the 0.25 capacity on demand increase that the customer has available to it at anytime. Program 12 divides the Relativity Value from the Ideas International Server Consolidation Analysis Report ("Ideas" parameter in this example) by the normalized (static) relative performance value for the standard "on demand" Unix servers, i.e. 4638. This normalization relative performance value is a different static value for the "on demand" Intel servers. Program 12 then multiplies together the results of these two equations together to determine the actual number of "on demand" CPUs required to perform the customer's estimated workload, i.e.

Required "On demand" CPUs=(PrimUtl/0.7)*(Ideas/
4638)

Program 12 determines the type of vendor server 16 (and platform software) based on the number of "on demand" CPUs required. For example, program 12 uses the following algorithm/formula to determine whether VMWare may be used to deliver a customer's server that requires less than 1.6 CPUs in the "on demand" environment. So, if there is an "on demand" server required and if the number of "on demand" CPUs is less than or equal to 1.6 then program 12 assigns a value of "1" to the "Vm" parameter.

Vm=IF(EE=1,IF(Cpus<=1.6,1,0),0)

If there is an "on demand" server required and if the number of "on demand" CPUs is more than 1.6 and less than 3.2 then program 12 assigns a value of "1" to the 4way parameter. This notifies an "on demand" delivery manager that a dedicated 4way "on demand" server is required for this customer.

4way=IF(EE=1(IF(Cpus<1.61,0,IF(Cpus>3.2,0,1)),0)

If an "on demand" server is required and if the number of "on demand" CPUs is more than 3.2 and less than 6.4 then program 12 assigns a value of "1" to the 8way parameter. This notifies the "on demand" delivery manager that a dedicated 8way "on demand" server is required for this customer.

8way=IF(EE=1(IF(Cpus<3.21,0,IF(Cpus>6.4,0,1)),0)

If there is an "on demand" server required and if the number of "on demand" CPUs is more than 6.4 then program 12 assigns a value of "1" to the 16way parameter. This notifies the "on demand" delivery manager that a dedicated 16way "on demand" server is required for this customer server.

16way=IF(EE=1(IF(Cpus>6.4,1,0)),0)

Program 12 optionally enforces a minimum usage requirements for VM Ware partitions, and this effects the required number of "on demand" CPUs based on the following algorithm/formula.

Fractional CPUs are not possible without VM Ware, so if the number of "on demand" CPUs is greater than 1.6 (thus making VM Ware an ineligible delivery option), program 12 rounds up the number of CPUs to the next whole integer. Program 12 derives the CpuM parameter value from the following algorithm/formula.

CpuM=IF(Cpus<=1.6,Cpus,ROUNDUP(Cpus,0))

Program 12 uses the following algorithm/formula to calculate the VMWare server CPU Hours for parameter VmHrsM.

VMHrsM=IF(Vm=1,(CpuHrs),0)

Program 12 uses the following formula to check if any 4way "on demand" servers are required. Program 12 uses the following formula to calculate the 4way server CPU Hours for parameter 4wayHrsM. By way of example, program 12 enforces a minimum usage requirement of 1022 hours by rounding up any value less than that amount.

4wayHrsM=IF(4way=1,IF(CpuHrs<1022,1022,(CpuHrs)),0)

Program 12 uses the following formula to check if any 8way "on demand" servers are required. Program 12 uses the following algorithm/formula calculates the 8way server CPU Hours for parameter 8wayHrsM. By way of example, program 12 enforces a minimum usage requirement of 2044 hours by rounding up any value less than that amount.

8wayHrsM=IF(8way=1,IF(CpuHrs<2044,2044,(CpuHrs)),0)

Program 12 uses the following algorithm/formula to check if any 16way "on demand" servers are required. Program 12 uses the following algorithm/formula to calculate the 16way server CPU Hours for parameter 16wayHrsM. By way of example, program enforces a minimum usage requirement of 4088 hours by rounding up any value less than that amount.

16wayHrsM=IF(16way=1,IF(CpuHrs<4088,4088,(CpuHrs)),0)

Program 12 adds together the VMWare, 4way, 8way and 16way CPU Hour Baseline totals for the Intel Server CPU Hour Baseline for entry into the "on demand" cost case.

Intel Server CPU Hour Baseline=SUM(VmHrsM+4wayHrsM+8wayHrsM+16wayHrsM)

Predefined, unit amounts of memory (RAM) are available in the "on demand" servers. Program 12 compares the required amount of memory for the customer (based on the customer's memory utilization in the customer's own servers) to the available amount of memory in the "on demand" servers. Program 12 also checks the memory requirements of the specific servers to be provided in "on demand" VM Ware servers. If the Vm parameter has a value of "1", then this customer is to be supplied with an "on demand" VM Ware server. Program 12 multiplies 1.25 GB of RAM times the number of "on demand" CPUs required for the vendor server. If the Vm parameter has a value less than 1, program 12 rounds up to one. Otherwise, program 12 multiplies the product of 1.25 and the number of "on demand" CPUs to yield the VramOD parameter value, i.e.

VramOD=IF(Vm=1,IF(1.25*CpuM>1,1.25*CpuM,1),0)

Program 12 checks the memory requirements of the vendor servers to be provided on dedicated 4-way, 8-way or 16-way servers. If 4way has a value of "1", then program 12 multiplies 1.25 GB of RAM times 4 CPUs. If 8way has a value of "1", then program 12 multiplies 1.25 GB of RAM times 8 CPUs. If 16way has a value of "1", then program 12 multiplies 1.25 GB of RAM times 16 CPUs. This is the RamOD parameter value, i.e.

RamOD=IF(4way=1,1.25*4,IF(8way=1,1.25*8,IF(16way=1,1.25*16,0)))

The equations that program 12 executed in step 104 were based on five peak utilization shift days per week (typically Monday through Friday) or twenty-two peak utilization shift days per month. The operator can change the number of peak utilization shift days per week (decision 105, yes branch) and re-execute the equations of step 104 to determine the adjusted server resource requirements. Thus, the operator can modify the foregoing equations by entering a value of twenty-six peak utilization shift days per month (six peak utilization shift days per week) or 30.4 (for seven peak utilization shift days per week). The following is an example of the adjusted server resource requirements:

A full month has 730 total hours. In this example "26" refers to six days a week having a prime shift. The total number of utilized CPU Hours per month in the customer's environment is as follows:

Customers CPU Hours=+((730−(26*PrimHrs))*Off-PrimUtl)+(26*PrimHrs*PrimUtl)

In the next example "30.4" refers to seven days a week having a prime shift. Total number of CPU Hours per month in the customer's environment is as follows:

Customers CPU Hours=+((730−(30.4*PrimHrs))*Off-PrimUtl)+(30.4*PrimHrs*PrimUtl)

Program 12 performs step 109 in an "on demand" or "utility" model when the customer is required to pay for a minimum amount of processor utilization and not exceed the standard memory allocation. If the equations in (the final iteration of) step 104 do not indicate such minimum processor utilization or indicate excessive memory requirements for the customer, program 12 will optionally increase the customer's "baselines" to the minimum levels, and charge the customer for the minimum processor utilization and cpu hour baseline, and create a memory adder baseline value equal to the additional memory required (step 109). Program 12 will notify the operator and customer of such uplift(s) to the minimum levels.

In step 110, program 12 specifies a preferred type of server in pool 13 for the customer's needs. This is based on the number of "on demand" CPUs required to meet the customer's workload. Program 12 performs this evaluation for each dedicated Unix or Intel server and for the aggregate total of CPUs required for VMWare lpars.

Generally, there is a cost savings to the customer when two or more of the customer's servers can be consolidated into one vendor server because there is only one operating system to execute and support, less physical hardware to dedicate to the customer, reduced software license fees, reduced network traffic, less overall server utilization due to execution of only one operating system and one set of management tools and one set of monitoring tools. The vendor typically charges the customer for the actual amount of cpu hour usage of the "on demand" servers as a variable cost. In addition, the vendor typically charges the customer for the number of "on demand" logical partitions and "on demand" servers dedicated to the customer as a fixed cost. Consequently, reducing the number of logical partitions and dedicated servers on which the application(s) execute(s), will generally decrease the vendor's charge to the customer.

There are multiple factors which determine whether two customer servers can be replaced with a single vendor server (in an "on demand" environment"). Some of the factors are hardware resource limitations, i.e. to consolidate the two customer servers into one vendor server, the one vendor server needs sufficient processor power, memory, I/O, access to storage, and network bandwidth, for all the applications and total workload of the two customer servers and to accommodate growth projected by the customer. Other factors are based on the function of the applications on the two customer servers and their compatibility and similarity, i.e. to consolidate the two customer servers into one vendor server, it is preferable and advantageous (although not necessarily required) that both applications (a) not be mission critical, (b) have the same application environment (c) perform similar functions, (d) have different peak demands/different prime shift periods (e) have the same operating system (which reduce transformation cost, and can be shared to reduce software license fees, processor and memory requirements and maintenance), (f) have similar application environments (such as Sun Microsystem's Java, Microsoft's .Net, IBM's Websphere, etc. which can then be shared to reduce software license fees, processor and memory requirements and maintenance) and (g) have similar business function (such that it is convenient for maintenance and operation to keep all such applications on the same server or in the same geographic delivery center, or better for performance to keep all applications responsible for backing up disk storage on servers located on high speed networks located close to the disk storage devices). An "Application Environment" is a user interface to a development environment for the application. The Application Environment includes one or more of the following: standards and protocols used to develop the application, compilation, version control and storage of executable code that has been developed for the application, and a testing environment for the application during development, such as a standalone testing environment solely for the application being developed.

In step 120, program 12 determines if the function performed by two or more of the customer's current servers can be consolidated into/performed by a single vendor server in the "on demand" or "utility" model.

FIGS. 4(A-E) illustrate step 120 in more detail in which program 12 determines whether two customer servers can be consolidated into one vendor server, and the type of such vendor server. To make this determination, the operator initially identifies to program 12 two or more customer servers for consolidation (step 200). In response, program 12 determines, based on the data previously entered for these customer servers in step 100, if the customer servers proposed for consolidation have identical (or >75% overlap) prime shift time periods (based on prime shift days and duration) (decision 204). If so, program 12 generates a warning for the operator that peak demands will likely overlap and therefore, consolidated server may impact SLA's, response time or job completion times. (step 206), but nevertheless proceeds to step 208 to continue with the consolidation proposal. In step 208, program 12 determines if the largest vendor server 16 identified in step 104 for any of the individual customer servers to be consolidated will have sufficient processor power for the two or more customer servers to be consolidated into one vendor server. To make this determination, program 12 adds together each baseline processor value, calculated in step 104, indicating processor requirements for all the customer servers considered for consolidation into server 16. If the result is less than or equal to the predetermined percentage, such as 75%, of the available processor power in this vendor server 16 (decision 210, no branch), then program 12 reports this to the operator (step 211), and proceeds to step 230 as described below to perform another test for server consolidation. However, if the result is greater than a predetermined percentage such as 75% of the available processor power in this vendor server 16 (decision 210, yes branch), then program 12 recommends against server consolidation in this type of vendor server with its processor size or quantity (step 212). Next, program 12 checks whether a vendor server with the next more powerful server or next greater quantity of servers has sufficient processor power for the consolidation (step 214). For example, if the vendor server considered in step 208 is 2way and has insufficient processor power for the consolidation, then program 12 will check whether a 4way vendor server has sufficient processor power for the consolidation (including 25% excess capacity). If the 4way vendor server has insufficient processor power for the consolidation (decision 218, yes branch), then program 12 recommends against server consolidation in this type of vendor server with its processor size or quantity (step 219). Next, program 12 checks whether there is a vendor server with more powerful processors or a greater quantity of processors (decision 220). For example, if the vendor server considered in step 214 is 4way and has insufficient processor power for the consolidation, then program 12 will check whether there is an 8way vendor server. If there is such a more powerful vendor server, then program 12 loops back to step 214 to determine whether this vendor server has sufficient processor power for the consolidation (including 25% excess capacity). If the 8way vendor server has insufficient processor power for the consolidation (decision 218, yes branch), then program 12 whether the vendor has a server with a more powerful processor or more processors (decision 220). The foregoing steps 214-220 are repeated until either program 12 identifies a vendor server with sufficient processor power for the consolidation, or evaluates all the vendor servers and determines that there is no vendor server with sufficient processor power for the consolidation. In the latter case, program 12 queries the operator whether the workload/processor requirements specified in step 100 for one or more of the customer servers to be consolidated can be changed to permit consolidation into a vendor server (step 224). If not, then program 12 recommends against consolidation (step 227). If so (decision 226, yes branch), the processing is repeated from step 100 with the new values for customer server processor requirements. If the vendor offers a server with sufficient power to permit consolidation, then program 12 reports to the operator the type of such vendor server (step 211). Program 12 also queries the operator to approve this type of server. By way of example, program 12 will reduce Unix server's prime shift memory utilization by 5%, xWindows server's prime shift memory utilization by 3%, Unix server's off-prime shift memory utilization by 3% and xWindows server's off-prime shift memory utilization by 1%.

Next, program 12 determines if the applications on the customer servers proposed for consolidation are identical or have similar function (decision 230). (If not, the desirability of consolidation may be reduced. For example, it would not be desirable to consolidate an e-mail server with an online transaction database server because peak e-mail demands would unacceptably slow the transaction response time.) Program 12 determines if the applications are identical by comparing the names of the applications entered in step 102. Program 12 determines if the applications have similar function by checking a table which lists which programs have similar function. If the applications are not all identical or do not all have similar function (decision 232, no branch), then program 12 generates a warning for the operator (step 233), identifies which applications are identical or have similar function and which are not identical and do not have similar function (step 234), and queries the operator whether the consolidation plan can be changed so that the dissimilar applications can be executed on a different vendor server (step 235). If the operator is willing to change the consolidation plan to execute the dissimilar applications on another server (decision 236, yes branch), then the operator returns to step 100 to delete these other applications from the current customer server(s) to be consolidated and switches them to another customer server. Otherwise, program 12 recommends against consolidation (step 238). If the applications are all identical or all have similar function (decision 232, yes branch), then program 12 determines if all the applications on the customer servers to be consolidated are compatible, i.e. Airline reservation software (step 240). Program 12 makes this determination based on the data previously entered for the customers servers in step 100. If all the applications on the servers to be consolidated are not compatible (decision 242, no branch), then program 12 generates a warning for the operator that the programs are not all compatible (step 243), identifies which applications, if any, are compatible and which applications are not compatible (step 244), and queries the operator whether the consolidation plan can be changed so that the incompatible applications can be executed on a different vendor server (step 245). If the operator is willing to change the consolidation plan (decision 246, yes branch), then the operator returns to step 100 to delete these incompatible applications from the current customer server(s) to be consolidated and switches them to another customer server. If the operator is not willing to relocate the incompatible applications, then program 12 recommends against consolidation (step 248). If the applications are all compatible (decision 242, yes branch), then program 12 determines if the application environment, middleware software and database software of the customer servers to be consolidated are identical or compatible (decision 250). Program 12 makes this determination by comparing the information entered in step 100 for each customer server which identifies the programs executing in each customer server, and a table which identifies which types of programs form each type of application environment, which types of programs are middleware, which types of application environment programs are compatible, and which other types of programs (including database applications) are compatible. If the application environment, middleware software and database software of the customer servers to be consolidated are not identical or compatible (decision 252, no branch), then program 12 generates a warning for the operator (step 253), identifies the different and incompatible application environments, middleware and database software (step 254), and queries the operator whether the consolidation plan can be changed so that the customer servers to be consolidated will all have the same or compatible application environments, middleware and database software (step 255). If the operator is willing to change the consolidation plan to provide compatibility of the application environments, middleware and database software (decision 256, yes branch), then the operator returns to step 100 to enter the same or compatible application environments, middleware and database software for the current customer server(s) to be consolidated. If the customer servers to be consolidated have the same or compatible application environments, middleware and database software (decision 252, yes branch), then the program 12 determines if all the customer servers considered for consolidation have the same operating system (decision 260). Program 12 makes this determination by comparing the information entered in step 100 for each customer server. If not (decision 262, no branch), then program 12 generates a warning for the operator (step 263), identifies the different operating systems (step 264), and queries the operator whether the consolidation plan can be changed so that the customer servers to be consolidated will all have the same operating system (step 265). If the operator is willing to change the consolidation plan (decision 266, yes branch), then the operator returns to step 100 to enter the same operating system for the current customer server(s) to be consolidated. If the operator is not willing to change the consolidation plan (step 266, no branch), then program 12 notifies the operator that the cost will increase due to the need for transformation to one operating system (step 268). The additional cost will include the additional license fee and maintenance, additional transformation cost (to the "on demand" environment), and additional processor and memory requirements to execute the additional operating system. If the customer servers to be consolidated have the same operating system (decision 262, yes branch), then program 12 determines if the memory requirements for the customer servers to be consolidated exceed the architectural capabilities of the vendor's "on demand" servers (step 270). (For example, a vendor's Unix server may have an architectural maximum of 192 GB of RAM.) To make this determination, program 12 combines together each baseline memory value, calculated in step 104 indicating memory requirements for all the customer servers considered for consolidation into a vendor server. However, there will be memory savings with server consolidation. For Unix, VMWare or dedicated "on demand" vendor servers, program 12 will automatically reduce by 40% to 60% the total of the customer's memory requirements for all customer servers being consolidated. If the result is greater than a predetermined percentage (such as 75%) of the architectural limit of the vendor server (decision 272, yes branch), then program 12 recommends against server consolidation in this type of server with its architectural memory limit either real or enforced by the vendor to keep 25% resources available for capacity on demand (step 273). So, program 12 checks whether the vendor offers another server with (next) larger memory capacity (decision 280). If so, then program 12 loops back to step 274 to determine whether this server with greater memory capacity has sufficient memory for the proposed server consolidation. If this vendor server with the next larger memory capacity has insufficient memory for the consolidation (decision 278, yes branch), then program 12 will check whether there is another vendor server with larger memory capacity (decision 280), Program 12 repeats step 274-280 until it identifies a vendor server with sufficient memory capacity or has checked the vendor server with the greatest memory capacity and it is inadequate. After completing steps 276-280, if the vendor offers a server with sufficient memory to permit the consolidation of the two or more customer servers, program 12 reports this to the operator in step 271. However, if the vendor does not offer a server with sufficient memory to permit consolidation, then program 12 queries the operator whether the memory requirements specified in step 100 can be changed to permit consolidation into a vendor server (step 284). If not, then program 12 recommends against consolidation (step 287). If so (decision 286, yes branch), the processing is repeated from step 100. If the vendor offers a server with sufficient memory to permit consolidation, then program 12 queries the operator whether this server is approved for consolidation (step 288). Next, program 12 determines additional memory cost if the vendor server selected for the consolidated customer servers requires more than the standard amount (for example, 75% of the architectural limit) of memory for that vendor server (step 290). Program 12 makes this determination based on information in a table which lists standard memory for each type of vendor server, and cost for additional memory (up to the architectural limit).

Thus, in steps 200-290 program 12 determines if the customer's application(s) which are currently executed on two or more customer servers can be installed and executed on a single standard "on demand" vendor server 16.

Referring again to FIG. 3, next program 12 determines if the vendor should use dedicated "blade" servers instead of dedicated Intel (x86 architecture) servers (step 300). Program 12 makes this determination by comparing the sum of all the vendor servers of one type required for the customer to a predetermined integer threshold. If the customer needs more than the predetermined integer of vendor servers, then program 12 notifies the operator that "blade" servers can be used for this customer. The blade servers typically have a lower delivery cost than dedicated Intel servers.

Next, program 12 queries the operator to enter information describing other factors that would affect the "on demand" cost to the customer (step 310). These other factors, which program 12 lists as candidates, include type of network the customer will use to access the vendorservers, software license fees for the customer's applications and vendor's operating system and middleware, costs, if any, to port the customer's applications to the vendor's hardware and software platform, costs for daily backups if requested by the customer, costs for special tape handling or creation, costs for disaster recovery if requested by the customer, and personnel costs for employees of the customer impacted by the transformation to the "on demand" model. In response, the operator will manually determine the additional cost.

Program 12 can be loaded into computer 10 from a computer readable medium such as a magnetic tape or disk, optical disk, DVD or other storage medium, or downloaded from the Internet 60 via TCP/IP adapter card 58. Program 12 is stored in storage 56 for execution by CPU 48 via RAM 52.

Based on the foregoing, a system, method and program product to estimate an amount of server resources in an "on demand" or "utility" server model required to satisfy needs of a customer, have been disclosed. However, numerous modifications and substitutions can be made without deviating from the scope of the present invention. For example, program 12 can be used to determine if server consolidation is advisable, and estimate server resource requirements, in environments other than "on demand". For example, program 12 can determine if server consolidation is advisable and estimate the server resource requirements in a server to be owned by the customer. Therefore, the present invention has been disclosed by way of illustration and not limitation, and reference should be made to the following claims to determine the scope of the present invention.

The invention claimed is:

1. A computer program product for determining if first and second different applications executed on respective first and second servers can be installed and executed on a single server, said computer program product comprising:
 a computer readable storage medium;
 first program instructions to determine prime shift hours for said first application and prime shift hours for said second application and an amount of overlap of said prime shift hours for said first application and said prime shift hours for said second application, and in response to said amount of overlap exceeding a predetermined threshold, generate and display a warning against installation and execution of said first and second applications on a single server; and
 second program instructions to determine if said first application and said second application provide substantially the same function as each other, and in response to said first application and said second application not providing substantially the same function as each other, generate and display a warning against installation and execution of said first and second applications on a single server; and wherein
 said first and second program instructions are stored on said computer readable storage medium.

2. A computer program product as set forth in claim 1 wherein said first program instructions also determine peak processor utilizations and times of said peak processor utilizations for said first and second applications, respectively, to determine whether said single server has sufficient processor power to execute said first and second applications.

3. A computer program product as set forth in claim 1 further comprising:
 third program instructions to determine if said first and second applications have a same type of user interface to a development environment, and in response to said first and second applications not having a same type of user interface to a development environment, generate and display a warning against installation and execution of said first and second applications on a single server; and wherein said third program instructions are stored on said computer readable storage medium.

4. A computer program product as set forth in claim 1 further comprising:
 third program instructions to determine if said first and second applications utilize a same type of middleware, and in response to said first and second applications not utilizing a same type of middleware, generate and display a warning against installation and execution of said first and second applications on a single server; and wherein said third program instructions are stored on said computer readable storage medium.

5. A computer program product as set forth in claim 1 further comprising:
 third program instructions to determine if said first and second applications are both critical to a business of said customer, and in response to said first and second applications both being critical to a business of said customer, generate and display a warning against installation and execution on a single server; and wherein said third program instructions are stored on said computer readable storage medium.

6. A computer program product as set forth in claim 1 further comprising:
 third program instructions, responsive to a determination that said first and second applications can be installed and executed on said single server, to determine as said single server a standard vendor server with sufficient processor power for executing said first and second applications; and wherein
 said third program instructions are stored on said computer readable storage, medium.

7. A computer program product as set forth in claim 6 wherein said third program instructions determine as said single server a standard vendor server with a smallest processor which is adequate to support processing requirements of said first and second applications and has a predetermined, minimum processing power in reserve.

8. A computer program product as set forth in claim 1 wherein said single server is an "on demand" vendor-owned server, and said first and second servers are owned or leased by said customer.

9. A computer system for determining if first and second different applications executed on respective first and second servers can be installed and executed on a single server, said computer system comprising:

a CPU, a computer readable storage and a memory;

first program instructions to determine prime shift hours for said first application and prime shift hours for said second application and an amount of overlap of said prime shift hours for said first application and said prime shift hours for said second application, and in response to said amount of overlap exceeding a predetermined threshold, generate and display a warning against installation and execution of said first and second applications on a single server; and second program instructions to determine if said first application and said second application provide substantially the same function as each other, and in response to said first application and said second application not providing substantially the same function as each other, generate and display a warning against installation and execution of said first and second applications on a single server; and wherein said first and second program instructions are stored in said computer readable storage for execution by said CPU via said memory.

10. A computer system as set forth in claim 9 wherein said first program instructions also determine peak processor utilizations and times of said peak processor utilizations for said first and second applications, respectively, to determine whether said single server has sufficient processor power to execute said first and second applications.

11. A computer system as set forth in claim 9 further comprising:

third program instructions to determine if said first and second applications have a same type of user interface to a development environment, and in response to said first and second applications not having a same type of user interface to a development environment, generate and display a warning against installation and execution of said first and second applications on a single server; and wherein said third program instructions are stored in said computer readable storage for execution by said CPU via said memory.

12. A computer system as set forth in claim 9 further comprising:

third program instructions to determine if said first and second applications utilize a same type of middleware, and in response to said first and second applications not utilizing a same type of middleware, generate and display a warning against installation and execution of said first and second applications on a single server; and wherein said third program instructions are stored on said computer readable storage for execution by said CPU via said memory.

13. A computer system as set forth in claim 9 further comprising:

third program instructions to determine if said first and second applications are both critical to a business of said customer, and in response to said first and second applications both being critical to a business of said customer, generate and display a warning against installation and execution on a single server; and wherein said third program instructions are stored in said computer readable storage for execution by said CPU via said memory.

14. A computer system as set forth in claim 9 further comprising:

third program instructions, responsive to a determination that said first and second applications can be installed and executed consolidated on said single server, to determine as said single server a standard vendor server with sufficient processor power for executing said first and second applications; and wherein said third program instructions are stored on said computer readable storage for execution by said CPU via said memory.

15. A computer system as set forth in claim 14 wherein said third program instructions determine as said single server a standard vendor server with a smallest processor which is adequate to support processing requirements of said first and second applications and has a predetermined, minimum processing power in reserve.

16. A computer system as set forth in claim 9 wherein said single server is an "on demand" vendor-owned server, and said first and second servers are owned or leased by said customer.

* * * * *